United States Patent
Kim et al.

(10) Patent No.: US 9,928,205 B2
(45) Date of Patent: Mar. 27, 2018

(54) SEMICONDUCTOR APPARATUS

(75) Inventors: Dae Suk Kim, Ichon-shi (KR); Jong Chern Lee, Ichon-shi (KR); Sang Jin Byeon, Ichon-shi (KR)

(73) Assignee: SK hynix Inc., Icheon-si Gyeonggi-do (KR)

( * ) Notice: Subject to any disclaimer, the term of this patent is extended or adjusted under 35 U.S.C. 154(b) by 833 days.

(21) Appl. No.: 13/162,702

(22) Filed: Jun. 17, 2011

(65) Prior Publication Data

US 2012/0154008 A1 Jun. 21, 2012

(30) Foreign Application Priority Data

Dec. 21, 2010 (KR) .................. 10-2010-0131999

(51) Int. Cl.
*G06F 13/42* (2006.01)
*G11C 16/20* (2006.01)
*G11C 5/02* (2006.01)
*G11C 5/04* (2006.01)
*G11C 5/06* (2006.01)
*H01L 25/065* (2006.01)

(52) U.S. Cl.
CPC .............................. *G06F 13/4247* (2013.01)

(58) Field of Classification Search
CPC .. G11C 16/20; G11C 5/02; G11C 5/04; G11C 5/06; G11C 5/066; H01L 25/0657

USPC ...................... 327/565; 365/51; 257/E23.068
See application file for complete search history.

(56) References Cited

U.S. PATENT DOCUMENTS

| | | | |
|---|---|---|---|
| 6,496,423 B2 * | 12/2002 | Lammers et al. | 365/189.12 |
| 6,740,981 B2 * | 5/2004 | Hosomi | 257/778 |
| 7,111,149 B2 * | 9/2006 | Eilert | 711/220 |
| 7,916,511 B2 * | 3/2011 | Park | 365/51 |
| 8,269,521 B2 * | 9/2012 | Wu | 326/21 |
| 2002/0052633 A1 * | 5/2002 | Prutchi et al. | 607/36 |

(Continued)

FOREIGN PATENT DOCUMENTS

KR 1020090102809 A 9/2009

*Primary Examiner* — Lincoln Donovan
*Assistant Examiner* — Colleen O Toole
(74) *Attorney, Agent, or Firm* — William Park & Associates Ltd.

(57) ABSTRACT

A semiconductor apparatus may include a master chip, first to $n^{th}$ slave chips, first to $n^{th}$ slave chip ID generating units, and a master chip ID generating unit. The first to $n^{th}$ slave chip ID generating units are disposed respectively in the first to $n^{th}$ slave chips and connected in series to each other. Each of the first to $n^{th}$ slave chip ID generating units is configured to add a predetermined code value to an $m^{th}$ operation code to generate an $(m+1)^{th}$ operation code. The master chip ID generating unit is disposed in the master chip to generate a variable first operation code in response to a select signal. Here, 'n' is an integer that is equal to or greater than 2, and 'm' is an integer that is equal to or greater than 1 and equal to or smaller than 'n'.

27 Claims, 5 Drawing Sheets

(56) References Cited

U.S. PATENT DOCUMENTS

2005/0082664 A1\* 4/2005 Funaba et al. ............... 257/724
2007/0126105 A1 6/2007 Yamada et al.

\* cited by examiner

|  | (a) | (b) | (c) |
|---|---|---|---|
| Int<0:2> | <111> | <111> | <111> |
| Var<0:2> | <010> | <010> | <100> |
| sel | 0 | 1 | 1 |
| mas<0:2> | <111> | <010> | <100> |
| Code_1<0:2> | <000> | <110> | <010> |
| Code_2<0:2> | <100> | <001> | <110> |
| Code_3<0:2> | <010> | <101> | <001> |
| Code_4<0:2> | <110> | <011> | <101> |
| Code_5<0:2> | <001> | <111> | <011> |
| Code_6<0:2> | <101> | <000> | <111> |
| Code_7<0:2> | <011> | <100> | <000> |
| Code_8<0:2> | <111> | <010> | <100> |
| Code_9<0:2> | <000> | <110> | <010> |

FIG.6

SEMICONDUCTOR APPARATUS

CROSS-REFERENCES TO RELATED APPLICATION

The present application claims priority under 35 U.S.C. § 119(a) to Korean Patent Application No. 10-2010-0131999, filed on Dec. 21, 2010, in the Korean Intellectual Property Office, which is incorporated herein by reference in its entirety as if set forth in full.

BACKGROUND

1. Technical Field

Various embodiments of the present invention relate to a semiconductor apparatus. In particular, certain embodiments relate to a semiconductor memory apparatus including a plurality of chips.

2. Related Art

The capacity and speed of semiconductor memories used as memory apparatuses in typical electronic systems have recently increased. Various attempts have been made to install a larger-capacity memory in a smaller area and drive the memory efficiently.

In order to improve the integration density of semiconductor memory devices, a three-dimensional (3D) arrangement technology may be used to stack a plurality of memory chips, evolving from a conventional two-dimensional (2D) arrangement technology. The trend toward high integration and high capacity of memory apparatuses requires a structure that increases the memory capacity by using a 3D arrangement structure of the memory chips and improves the integration density by reducing the semiconductor chip size.

A through-silicon via (TSV) technique may be used as such a 3D arrangement technology. The TSV technique is used as an alternative to overcome the degradation of a transmission rate according to the distance from a controller on a module, the weakness of a data bandwidth, and the degradation of a transmission rate generated according to the parameters on a package. The TSV technique creates a path penetrating a plurality of memory chips and forms an electrode in the path to conduct the communication between the controller and the plurality of chips. A TSV-based stack semiconductor memory apparatus directly connects it through a via on a controller without using wires, package subs, and package balls that are used in an SIP technique and in a POP technique. A bump is formed between the paths penetrating a plurality of memory chips, to electrically connect the controller or each memory chip.

A semiconductor memory apparatus based on a 3D arrangement technique may include a master chip and a plurality of slave chips. A plurality of slave chips may be used as memory devices, and the master chip may control the slave chips. Different chip IDs are allocated to the slave chips to select a desired slave chip. A recording operation such as fuse cutting is performed on one-time recording devices (e.g., fuses) to allocate chip IDs to the slave chips. However, fuses occupy a large area in semiconductor apparatuses, and an operation of recording a chip ID in each slave chip requires high costs (e.g., the amount of money and time).

SUMMARY

Accordingly, there is a need for an improved memory system that can efficiently control a plurality of semiconductor memories.

To attain the advantages and in accordance with the purposes of the invention, as embodied and broadly described herein, one exemplary aspect of the present invention may provide a semiconductor apparatus which includes: a master chip; first to $n^{th}$ slave chips; first to $n^{th}$ slave chip ID generating units disposed respectively in the first to $n^{th}$ slave chips and connected in series to each other, each of the first to $n^{th}$ slave chip ID generating units being configured to add a predetermined code value to an $m^{th}$ operation code to generate an $(m+1)^{th}$ operation code; and a master chip ID generating unit disposed in the master chip to generate a variable first operation code in response to a select signal. Here, 'n' is an integer that is equal to or greater than 2, and 'm' is an integer that is equal to or greater than 1 and equal to or smaller than 'n'.

In another exemplary aspect of the present invention, a semiconductor apparatus may include: a master chip; a slave chip; a selecting unit disposed in the master chip to select one of an initial code and a variable code according to a select signal and generate a first operation code; and a slave chip ID generating unit disposed in the slave chip to add '1' to the first operation code and generate a second operation code.

In another exemplary aspect of the present invention, a semiconductor apparatus may include: a master chip; first to $n^{th}$ slave chips; a plurality of slave chip ID generating units disposed respectively in the first to $n^{th}$ slave chips and connected in series to each other to subtract '1' from an $m^{th}$ operation code and generate an $(m+1)^{th}$ operation code; and a master chip ID generating unit disposed in the master chip to generate a variable first operation code in response to a select signal. Here, 'n' is an integer that is equal to or greater than 2, and 'm' is an integer that is equal to or greater than 1 and equal to or smaller than 'n'.

In another exemplary aspect of the present invention, a semiconductor apparatus may include: a master chip; a slave chip; a selecting unit disposed in the master chip to select one of an initial code and a variable code according to a select signal and generate a first operation code; and a slave chip ID generating unit disposed in the slave chip to subtract '1' from the first operation code and generate a second operation code.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments consistent with the invention and, together with the description, serve to explain the principles of the invention.

DETAILED DESCRIPTION

Reference will now be made in detail to the exemplary embodiments consistent with the present disclosure, examples of which are illustrated in the accompanying drawings. Wherever possible, the same reference characters will be used throughout the drawings to refer to the same or like parts.

A semiconductor apparatus according to an exemplary embodiment of the present invention may include a chip ID (Identification) generating unit in each of a master chip and a plurality of slave chips. Also, in the semiconductor apparatus, the chip ID generating units may be connected in series so that the chip ID generating units of the slave chips may sequentially generate different operation codes when the master chip outputs an operation code of a predetermined number of bits. Also, in the semiconductor apparatus, the chip IDs allocated to the slave chips may be changed by changing the operation code outputted from the master chip.

Figure 1:
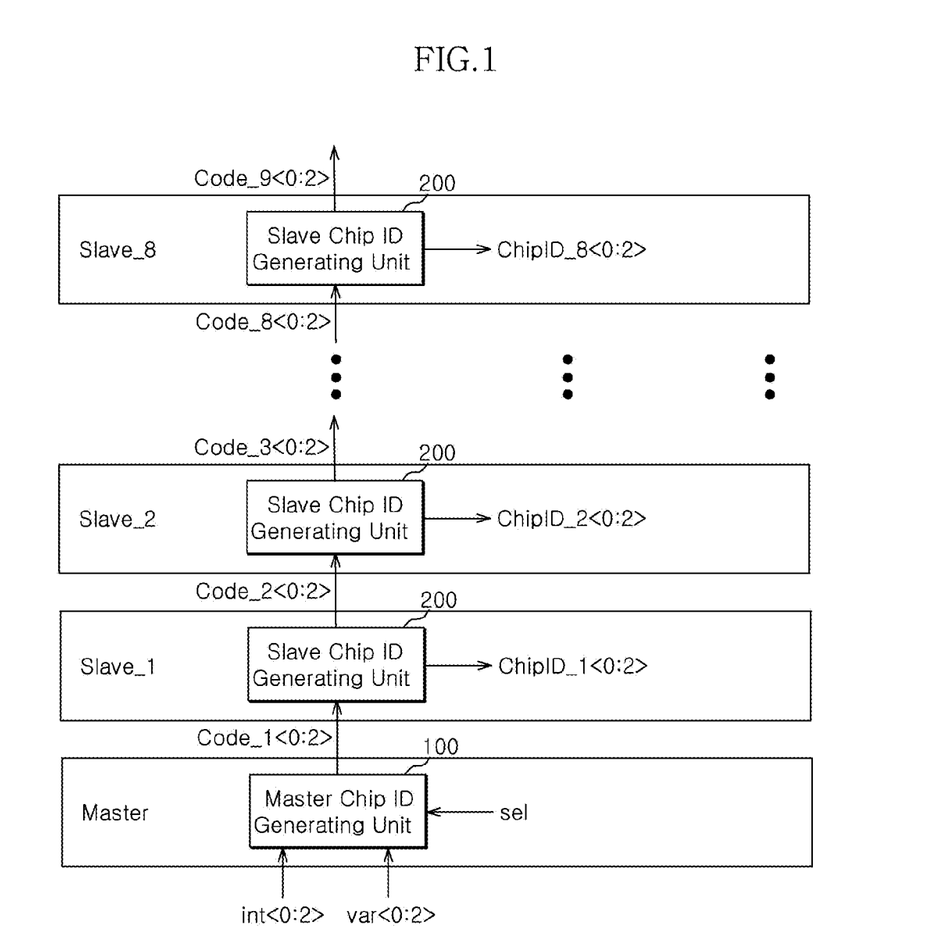
FIG. 1 is a block diagram of a semiconductor apparatus according to an exemplary embodiment of the present invention.

FIG. 1 is a block diagram of a semiconductor apparatus according to an exemplary embodiment of the present invention.

The semiconductor apparatus may include a master chip and a plurality of slave chips. As an exemplary embodiment, FIG. 1 illustrates that the semiconductor apparatus includes a master chip Master and eight slave chips Slave_1 to Slave_8; however, the present invention is not limited thereto.

As illustrated in FIG. 1, the master chip Master may include a master chip ID generating unit 100, and each of the eight slave chips Slave_1 to Slave_8 may include a slave chip ID generating unit 200. The master chip ID generating unit 100 and the eight slave chip ID generating units 200 are connected in series.

The master chip ID generating unit 100 generates a first operation code Code_1<0:2>. The master chip ID generating unit 100 adjusts the value of the first operation code Code_1<0:2> in response to a select signal Sel.

The slave chip ID generating unit 200 of the first slave chip Slave_1 may add '1' to the first operation code Code_1<0:2> to generate a second operation code Code_2<0:2>. For example, if the first operation code Code_1<0:2> is <100>, the second operation code Code_2<0:2> may be <101>.

The slave chip ID generating unit 200 of the second slave chip Slave_2 adds '1' to the second operation code Code_2<0:2> and generates a third operation code Code_3<0:2>.

The third to eighth slave chips Slave_3 to Slave_8 operate in the same manner as the first and second slave chips Slave_1 and Slave_2, and thus a detailed description thereof will be omitted for conciseness.

According to this configuration, the first to eighth slave chips Slave_1 to Slave_8 may have their respective chip IDs ChipID_1<0:2> to ChipID_8<0:2> increasing one by one from the first operation code Code_1<0:2>. In an exemplary embodiment, the first to eighth slave chips Slave_1 to Slave_8 may have their respective chip IDs ChipID_1<0:2> to ChipID_8<0:2> corresponding to the first to eighth operation codes Code_1<0:2> to Code_8<0:2> received by their respective slave chip ID generating units 200. In another exemplary embodiment, the first to eighth slave chips Slave_1 to Slave_8 may have their respective chip IDs ChipID_1<0:2> to ChipID_8<0:2> corresponding to the second to ninth operation codes Code_2<0:2> to Code_9<0:2> generated by their respective slave chip ID generating units 200. This may be set by a designer.

Also, referring to FIG. 1, the first to ninth operation codes Code_1<0:2> to Code_9<0:2> and the first to eighth chip IDs ChipID_1<0:2> to ChipID_8<0:2> comprise 3 bits each. The reason for this is that the semiconductor apparatus is illustrated as including eight slave chips. Although FIG. 1 illustrates that the first to ninth operation codes Code_1<0:2> to Code_9<0:2> and the first to eighth chip IDs ChipID_1<0:2> to ChipID_8<0:2> are 3-bit signals, it should not be construed as limiting the number of bits of signals for implementing the present invention.

Also, according to the configurations of the slave chip ID generating units 200, the first to eighth slave chips Slave_1 to Slave_8 may have their respective chip IDs ChipID_1<0:2> to ChipID_8<0:2> decreasing one by one from the first operation code Code_1<0:2>. This will be described below in more detail with reference to FIG. 6.

Figure 2:
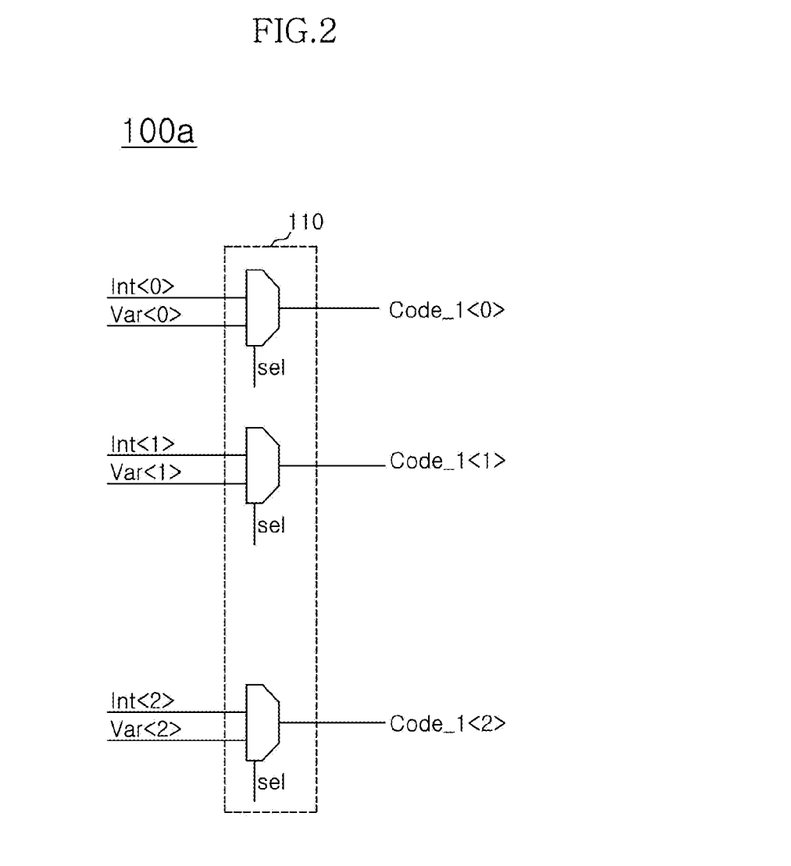
FIG. 2 is a circuit diagram of an exemplary embodiment of a master chip ID (Identification) generating unit illustrated in FIG. 1.

FIG. 2 is a circuit diagram of an exemplary embodiment 100a of the master chip ID generating unit 100 illustrated in FIG. 1.

Referring to FIG. 2, the master chip ID generating unit 100a may include a selecting unit 110. The selecting unit 110 selects one of an initial code Int<0:2> and a variable code Var<0:2> according to the select signal Sel and generates the first operation code Code_1<0:2>.

When the select signal Sel is activated, the selecting unit 110 outputs the variable code Var<0:2> as the first operation code Code_1<0:2>. On the other hand, when the select signal Sel is deactivated, the selecting unit 110 outputs the initial code Int<0:2> as the first operation code Code_1<0:2>. The initial code Int<0:2> may include a voltage of a fixed level. For example, if the initial code Int<0:2> is set to <111>, an input terminal of the initial code Int<0:2> may be connected to a power supply voltage (VDD) terminal so that all of the three bits of the initial code Int<0:2> have a logic value '1'. The variable code Var<0:2> may include a test mode signal. If the variable code Var<0:2> includes a test mode signal, the semiconductor apparatus according to an exemplary embodiment of the present invention can externally adjust the chip IDs ChipID_1<0:2> to ChipID_8<0:2> of the slave chips Slave_1 to Slave_8. The select signal Sel may also include a test mode signal. For example, if the initial code Int<0:2> is set to <111> and the variable code Var<0:2> is set to <100>, the first operation code Code_1<0:2> is <100> when the select signal Sel is activated, and is <111> when the select signal Sel is deactivated. As illustrated in FIG. 2, the selecting unit 110 may include a typical multiplexer (MUX) circuit.

Figure 3:
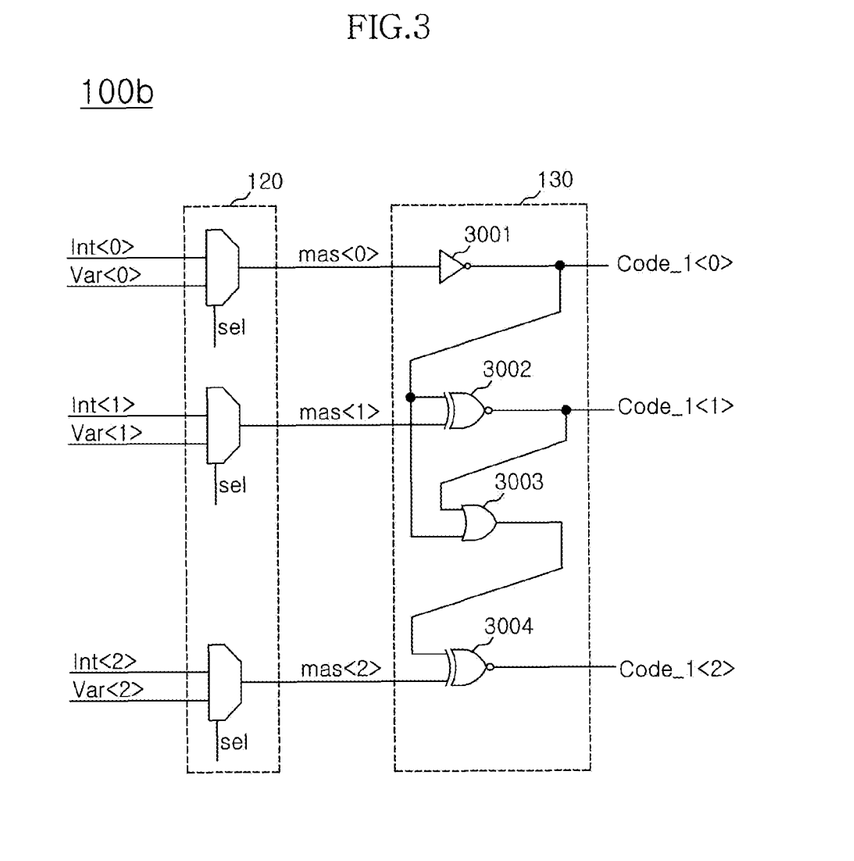
FIG. 3 is a circuit diagram of another exemplary embodiment of the master chip ID generating unit illustrated in FIG. 1.

FIG. 3 is a circuit diagram of another exemplary embodiment 100b of the master chip ID generating unit 100 illustrated in FIG. 1.

Referring to FIG. 3, the master chip ID generating unit 100b may include a master code generating unit 120 and an operation code generating unit 130.

The master code generating unit 120 selects one of an initial code Int<0:2> and a variable code Var<0:2> according to the select signal Sel and generates a master code Mas<0:2>.

When the select signal Sel is activated, the master code generating unit 120 outputs the variable code Var<0:2> as the master code Mas<0:2>. On the other hand, when the select signal Sel is deactivated, the master code generating unit 120 outputs the initial code Int<0:2> as the master code Mas<0:2>. The initial code Int<0:2> may include a voltage of a fixed level. For example, if the initial code Int<0:2> is set to <111>, an input terminal of the initial code Int<0:2> may be connected to a power supply voltage (VDD) terminal so that all of the three bits of the initial code Int<0:2> have a logic value '1'. The variable code Var<0:2> may include a test mode signal. The select signal Sel may also include a test mode signal. For example, if the initial code Int<0:2> is set to <111> and the variable code Var<0:2> is set to <100>, the master code Mas<0:2> is <100> when the select signal Sel is activated, and is <111> when the select signal Sel is deactivated. As illustrated in FIG. 3, the master code generating unit 120 may include a typical multiplexer (MUX) circuit.

The operation code generating unit 130 adds '1' to the master code Mas<0:2> and generates the first operation code Code_1<0:2>.

For example, if the master code Mas<0:2> is <010>, the first operation code Code_1<0:2> is <011>. Here, the second to ninth operation codes Code_2<0:2> to Code_9<0:2> including the first operation code Code_1<0:2>, which will be described below, have a cyclic structure in which the minimum value follows the maximum value. Specifically, if the master code Mas<0:2> is <111>, the first operation code Code_1<0:2> is <000>. That is, the first to ninth operation codes Code_1<0:2> to Code_9<0:2> comprise 3 bits each, and adding '1' to the code value <111> results in the code value <000>.

As illustrated in FIG. 3, the operation code generating unit 130 may include an inverter 3001, XNOR gates 3002 and 3004, and an OR gate 3003.

The inverter 3001 inverts the master code Mas<0> and outputs the first operation code Code_1<0>.

The XNOR gate 3002 performs an XNOR operation on the output signal of the inverter 3001 and the master code Mas<1> and outputs the first operation code Code_1<1>.

The OR gate 3003 performs an OR operation on the output signal of the XNOR gate 3002 and the output signal of the inverter 3001.

The XNOR gate 3004 performs an XNOR operation on the output signal of the OR gate 3003 and the master code Mas<2> and outputs the first operation code Code_1<2>.

When the operation code generating unit 130 receives <111> as the master code Mas<0:2>, the inverter 3001 outputs <0> as the first operation code Code_1<0>. Also, the XNOR gate 3002 outputs <0> as the first operation code Code_1<1>. Also, the OR gate 3003 outputs a signal '0', and the XNOR gate 3004 outputs <0> as the first operation code Code_1<2>. That is, in response to the master code Mas<0:2>=<111>, the operation code generating unit 130 outputs <000> as the first operation code Code_1<0:2>.

Unlike the master chip ID generating unit 100a of FIG. 2, the master chip ID generating unit 100b of FIG. 3 uses the operation code generating unit 130 to add '1' to the master code Mas<0:2> and generate the first operation code Code_1<0:2>. This is to allow the master chip ID generating unit 100b to correspond to the slave chip ID generating unit 200 which will be described below. This configuration may vary according to the loading difference between the master chip Master and the slave chips Slave_1 to Slave_8, or according to the code values of the chip IDs ChipID_1<0:2> to ChipID_8<0:2> that are to be allocated to the slave chips Slave_1 to Slave_8.

Figure 4:
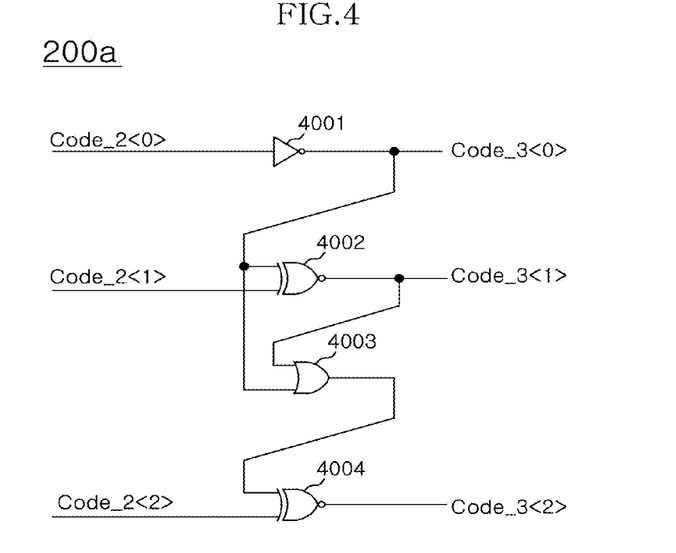
FIG. 4 is a circuit diagram of an exemplary embodiment of a slave chip ID generating unit illustrated in FIG. 1.

FIG. 4 is a circuit diagram of an exemplary embodiment 200a of the slave chip ID generating unit 200 illustrated in FIG. 1. FIG. 4 illustrates the slave chip ID generating unit 200 of the second slave chip Slave_2 by way of example.

As described above, the slave chip ID generating unit 200a may add '1' to the operation code received from the previous chip and outputs the resulting operation code to the next chip. Referring to FIG. 4, the slave chip ID generating unit 200a of the second slave chip Slave_2 may add '1' to the second operation code Code_2<0:2> to generate the third operation code Code_3<0:2>.

The slave chip ID generating unit 200a of the second slave chip Slave_2 may be configured in the same manner as the operation code generating unit 130 of FIG. 3. The slave chip ID generating unit 200a of the second slave chip Slave_2 may include an inverter 4001, XNOR gates 4002 and 4004, and an OR gate 4003. The slave chip ID generating unit 200a of the second slave chip Slave_2 operates in the same manner as the operation code generating unit 130 of FIG. 3, and thus a detailed description thereof will be omitted for conciseness.

As illustrated in FIG. 4, the slave chip ID generating unit 200a of the second slave chip Slave_2 may use the outputted third operation code Code_3<0:2> as the chip ID ChipID2<0:2> of the second slave chip Slave_2. Although not illustrated in the drawings, the inputted second operation code Code_2<0:2> may be used as the chip ID ChipID2<0:2> of the second slave chip Slave_2. Since the inputted operation codes and the outputted operation codes increase sequentially on a chip-by-chip basis, they may be used as the chip IDs. FIG. 4 illustrates that the outputted third operation code Code_3<0:2> is used as the chip ID ChipID2<0:2> of the second slave chip Slave_2.

Figure 5:
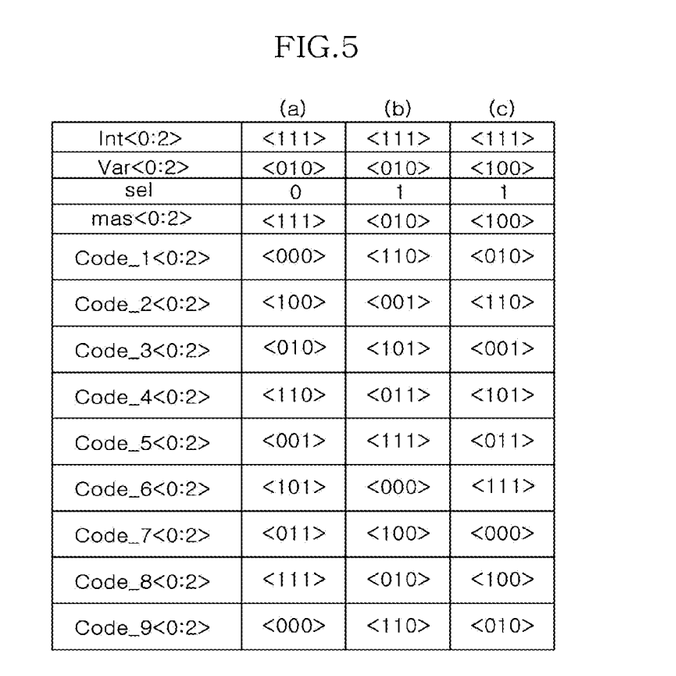
FIG. 5 is a table illustrating an exemplary embodiment of first to ninth operation codes of eight slave chips according to an operation of the master chip ID generating unit.

FIG. 5 is a table illustrating an exemplary embodiment of the first to ninth operation codes Code_1<0:2> to Code_9<0:2> of the eight slave chips Slave_1 to Slave_8 according to an operation of the master chip ID generating unit 100.

Referring to FIG. 5, the initial code Int<0:2> is set to <111> in the cases of (a), (b) and (c). The variable code Var<0:2> is set to <010> in the cases of (a) and (b), and is set to <100> in the case of (c).

A case (a) of FIG. 5 corresponds to the case where the select signal Sel is deactivated to '0'. Accordingly, the master code generating unit 120 outputs the initial code Int<0:2> as the master code Mas<0:2>. That is, in the case (a) of FIG. 5, the master code Mas<0:2> is <111>. Thereafter, the operation code generating unit 130 and the slave chip ID generating unit 200 cause the first to ninth operation codes Code_1<0:2> to Code_9<0:2> to increase one by one from <000>.

A case (b) of FIG. 5 corresponds to the case where the variable code Var<0:2> is set to <010> and the select signal Sel is activated to '1'. Accordingly, the master code generating unit 120 outputs the variable code Var<0:2> as the master code Mas<0:2>. That is, in the case (b) of FIG. 5, the master code Mas<0:2> is <010>. Thereafter, the operation code generating unit 130 and the slave chip ID generating unit 200 cause the first to ninth operation codes Code_1<0: 2> to Code_9<0:2> to increase one by one from <110>. In this manner, because the master chip ID generating unit 100 generates the first operation code Code_1<0:2> differently according to the select signal Sel, the semiconductor apparatus according to an exemplary embodiment of the present invention may vary the values of the first to ninth operation codes Code_1<0:2> to Code_9<0:2>. Because the first to ninth operation codes Code_1<0:2> to Code_9<0:2> are allocated as the chip IDs ChipID_1<0:2> to ChipID_9<0:2> of the first to eighth slave chips Slave_1 to Slave_8, the semiconductor apparatus according to an exemplary embodiment of the present invention may set the chip IDs ChipID_1<0:2> to ChipID_9<0:2> of the first to eighth slave chips Slave_1 to Slave_8 differently through the master chip ID generating unit 100.

A case (c) of FIG. 5 corresponds to the case where the select signal Sel is activated to '1' and the variable code Var<0:2> is set to <100>. Accordingly, the master code generating unit 120 outputs the variable code Var<0:2> as the master code Mas<0:2>. That is, in the case (c) of FIG. 5, the master code Mas<0:2> is <100>. Thereafter, the operation code generating unit 130 and the slave chip ID generating unit 200 cause the first to ninth operation codes Code_1<0:2> to Code_9<0:2> to increase one by one from <010>. In this manner, the semiconductor apparatus according to an exemplary embodiment of the present invention may vary the values of the first to ninth operation codes Code_1<0:2> to Code_9<0:2> by adjusting the variable code Var<0:2> inputted to the master chip ID generating unit 100. Because the first to ninth operation codes Code_1<0:2> to Code_9<0:2> are allocated as the chip IDs ChipID_1<0: 2> to ChipID_9<0:2> of the first to eighth slave chips Slave_1 to Slave_8, the semiconductor apparatus according to an exemplary embodiment of the present invention may set the chip IDs ChipID_1<0:2> to ChipID_9<0:2> of the first to eighth slave chips Slave_1 to Slave_8 differently by adjusting the variable code Var<0:2>.

As described above, the first to ninth operation codes Code_1<0:2> to Code_9<0:2> are 3-bit codes. As illustrated in FIG. 5, the first to ninth operation codes Code_1<0:2> to Code_9<0:2> have a sequential structure in which they increase sequentially on a bit-by-bit basis, and has a cyclic structure in which adding '1' to the code value <111> results in the code value <000>.

In this manner, because the semiconductor apparatus according to an exemplary embodiment of the present invention can allocate the chip IDs ChipID1<0:2> to ChipID8<0:2> differently, it can flexibly control the slave chips Slave_1 to Slave_8 instead of using the slave chips Slave_1 to Slave_8 in a fixed manner.

As described above, the semiconductor apparatus according to an exemplary embodiment of the present invention is configured such that the slave chips Slave_1 to Slave_8 have their respective IDs ChipID1<0:2> to ChipID8<0:2> that increase sequentially. However, the semiconductor apparatus according to another exemplary embodiment of the present invention may be configured such that the slave chips Slave_1 to Slave_8 have their respective IDs ChipID1<0:2> to ChipID8<0:2> that decrease sequentially. If the slave chip ID generating unit 200b is configured as illustrated in FIG. 6, the slave chips Slave_1 to Slave_8 may have their respective IDs ChipID1<0:2> to ChipID8<0:2> that decrease sequentially.

Figure 6:
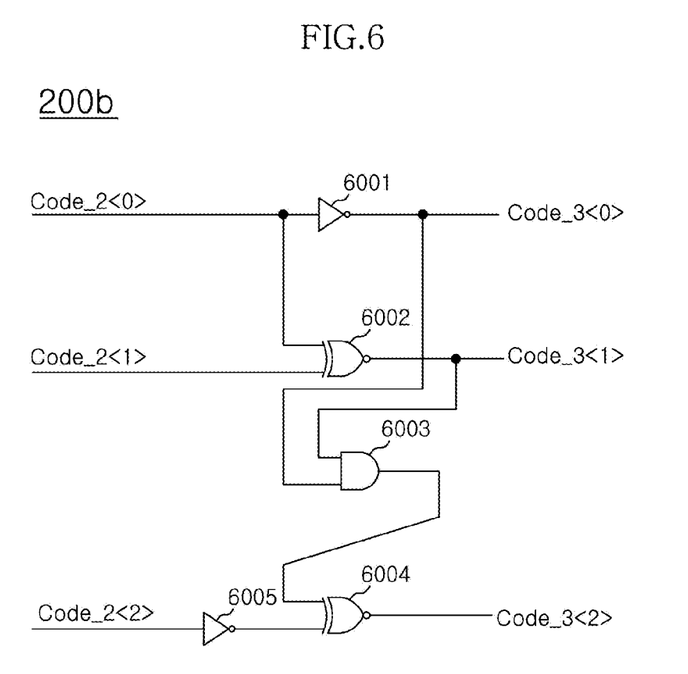
FIG. 6 is a circuit diagram of another exemplary embodiment of the slave chip ID generating unit illustrated in FIG. 1.

FIG. 6 is a circuit diagram of another exemplary embodiment 200b of the slave chip ID generating unit 200 illustrated in FIG. 1.

Referring to FIG. 6, the slave chip ID generating unit 200b is configured such that the first to eighth slave chips Slave_1 to Slave_8 have their respective chip IDs ChipID_1<0:2> to ChipID_8<0:2>) decreasing one by one from the first operation code Code_1<0:2>.

Unlike the slave chip ID generating unit 200a of FIG. 4, the slave chip ID generating unit 200b of FIG. 6 subtracts '1' from the operation code received from the previous chip and outputs the resulting operation code to the next chip.

The slave chips Slave_1 to Slave_8 including the slave chip ID generating unit 200b of FIG. 6 have the first to ninth operation codes Code_1<0:2> to Code_9<0:2> that decrease sequentially.

Accordingly, the slave chips Slave_1 to Slave_8 may have their respective chip IDs ChipID1<0:2> to ChipID_8<0:2> that decrease sequentially.

FIG. 6 illustrates the slave chip ID generating unit 200b of the second slave chip Slave_2 by way of example.

Referring to FIG. 6, the slave chip ID generating unit 200b may include inverters 6001 and 6005, XNOR gates 6002 and 6004, and an AND gate 6003.

The inverter 6001 inverts the second operation code Code_2<0> and outputs the third operation code Code_3<0>.

The XNOR gate 6002 performs an XNOR operation on the second operation code Code_2<0> and the second operation code Code_2<1> and outputs the third operation code Code_3<1>.

The AND gate 6003 performs an AND operation on the output signal of the XNOR gate 6002 and the output signal of the inverter 6001.

The inverter 6005 inverts the second operation code Code_2<2>.

The XNOR gate 6004 performs an XNOR operation on the output signal of the AND gate 6003 and the output signal of the inverter 6005 and outputs the third operation code Code_3<2>.

When the slave chip ID generating unit 200b receives <111> as the second operation code Code_2<0:2>, the inverter 6001 outputs <0> as the third operation code Code_3<0>. Also, the XNOR gate 6002 outputs <1> as the third operation code Code_3<1>. Also, the AND gate 6003 outputs a signal '0', and the XNOR gate 6004 outputs <1> as the third operation code Code_3<2>. That is, in response to the second operation code Code_2<0:2>=<111>, the slave chip ID generating unit 200b outputs <011> as the third operation code Code_3<0:2>.

Also, an exemplary embodiment of the present invention may be configured in such a way to add a value of '2' or greater to the operation code of the previous chip according to the number of slave chips and the number of bits of each code. Although FIGS. 2 and 4 illustrate that the semiconductor apparatus adds '1' to the operation code of the previous chip and transmits the resulting operation code to the next chip, it should not be construed as limiting an operation (e.g., addition or subtraction) or a value (e.g., '1') for implementing the present invention.

The technical concept of the present invention is more effective for a semiconductor apparatus including a master chip and a plurality of slave chips that are connected through a TSV structure. In the case of a semiconductor apparatus including a plurality of chips connected through a TSV structure, due to the characteristics of its stack structure, an operation of recording chip IDs in one-time recording devices (e.g., fuses) is difficult and requires high cost. The semiconductor apparatus according to an exemplary embodiment of the present invention can be easily used even in a stack structure of a plurality of chips, because it is configured in such a way that the first operation code Code_1<0:2> outputted from the master chip Master is sequentially processed by the slave chips Slave_1 to Slave_8 to generate a new operation code. Also, the semiconductor apparatus according to an exemplary embodiment of the present invention does not need fuses for recording the chip IDs. Therefore, because a one-time recording device such as a fuse occupies a large area in a semiconductor apparatus, the present invention can increase the integration density of semiconductor apparatuses.

While certain embodiments have been described above, it will be understood to those skilled in the art that the embodiments described are by way of example only. Accordingly, the semiconductor apparatus described herein should not be limited based on the described embodiments. Rather, the semiconductor apparatus described herein should only be limited in light of the claims that follow when taken in conjunction with the above description and accompanying drawings.

What is claimed is:

1. A semiconductor apparatus comprising:
   a master chip;
   first to $n^{th}$ slave chips;
   first to $n^{th}$ slave chip ID generating units disposed respectively in the first to $n^{th}$ slave chips and connected in series to each other, each of the first to $n^{th}$ slave chip ID generating units being configured to add a predetermined code value to an $m^{th}$ operation code to generate an $(m+1)^{th}$ operation code;
   a master chip ID generating unit disposed in the master chip to generate a variable first operation code from one of an initial code having a plural bits and an variable code having a plural bits in response to a select signal; and
   a selecting unit outputs the variable code when the select signal is activated and outputs the initial code when the select signal is deactivated,
   wherein 'n' is an integer that is equal to or greater than 2, and 'm' is an integer that is equal to or greater than 1 and equal to or smaller than 'n.

2. The semiconductor apparatus according to claim 1, wherein the variable code includes a test mode signal.

3. The semiconductor apparatus according to claim 1, wherein the select signal includes a test mode signal.

4. The semiconductor apparatus according to claim 1, wherein the master chip ID generating unit comprises:
   a master code generating unit configured to select one of the initial code and the variable code according to the select signal and generate a master code; and
   an operation code generating unit configured to add the predetermined code value to the master code to generate the first operation code.

5. The semiconductor apparatus according to claim 4, wherein the initial code, the master code and the first operation code are 3-bit signals, and the operation code generating unit comprises:
   an inverter unit configured to invert the first bit of the master code and generate the first bit of the first operation code;
   a first XNOR gate unit configured to perform an XNOR operation on the output signal of the inverter unit and the second bit of the master code and generate the second bit of the first operation code;
   an OR gate unit configured to perform an OR operation on the output signal of the first XNOR gate unit and the output signal of the inverter unit; and
   a second XNOR gate unit configured to perform an XNOR operation on the output signal of the OR gate unit and the third bit of the master code and generate the third bit of the first operation code.

6. The semiconductor apparatus according to claim 1, wherein the predetermined code value is '1'.

7. The semiconductor apparatus according to claim 1, wherein the predetermined code value is '−1'.

8. The semiconductor apparatus according to claim 1, wherein the first to $(n+1)^{th}$ operation codes are 3-bit signals, and the slave chip ID generating unit of the $m^{th}$ slave chip comprises:
   an inverter unit configured to invert the first bit of the $m^{th}$ operation code and generate the first bit of the $(m+1)^{th}$ operation code;
   a first XNOR gate unit configured to perform an XNOR operation on the output signal of the inverter unit and the second bit of the $m^{th}$ operation code and generate the second bit of the $(m+1)^{th}$ operation code;
   an OR gate unit configured to perform an OR operation on the output signal of the first XNOR gate unit and the output signal of the inverter unit; and
   a second XNOR gate unit configured to perform an XNOR operation on the output signal of the OR gate unit and the third bit of the $m^{th}$ operation code and generate the third bit of the $(m+1)^{th}$ operation code.

9. The semiconductor apparatus according to claim 1, wherein the $m^{th}$ slave chip has the $m^{th}$ operation code as the chip ID, and the first to $n^{th}$ slave chips have different chip IDs with each other.

10. The semiconductor apparatus according to claim 1, wherein the $m^{th}$ slave chip has the $(m+1)^{th}$ operation code as the chip ID, and the first to $n^{th}$ slave chips have different chip IDs with each other.

11. The semiconductor apparatus according to claim 1, wherein the master chip ID generating unit and the n slave chip ID generating units are connected in series through a through-silicon via (TSV) structure.

12. The semiconductor apparatus according to claim 1, wherein the first to $(n+1)^{th}$ operation codes cycle sequentially.

13. A semiconductor apparatus comprising:
    a master chip;
    a slave chip;
    a selecting unit disposed in the master chip to select one of an initial code and a variable code according to a select signal and generate a first operation code, wherein the selecting unit outputs the variable code when the select signal is activated and outputs the initial code when the select signal is deactivated; and
    a slave chip ID generating unit disposed in the slave chip to add '1' to the first operation code and generate a second operation code.

14. The semiconductor apparatus according to claim 13, wherein the slave chip has the first operation code as a chip ID.

15. The semiconductor apparatus according to claim 13, wherein the slave chip has the second operation code as a chip ID.

16. The semiconductor apparatus according to claim 13, wherein the first operation code and the second operation code cycle sequentially.

17. The semiconductor apparatus according to claim 13, wherein the selecting unit and the slave chip ID generating unit are connected through a through-silicon via (TSV) structure.

18. The semiconductor apparatus according to claim 13, wherein the selecting unit selects one of an initial code and a variable code according to the select signal to generate a master code, and adds '1' to the master code to generate the first operation code.

19. A semiconductor apparatus comprising:
- a master chip;
- first to $n^{th}$ slave chips;
- a plurality of slave chip ID generating units disposed respectively in the first to $n^{th}$ slave chips and connected in series to each other to subtract '1' from an $m^{th}$ operation code and generate an $(m+1)^{th}$ operation code;
- a master chip ID generating unit disposed in the master chip to generate a variable first operation code from one of an initial code having a plural bits and a variable code having a plural bits in response to a select signal; and
- a selecting unit outputs the variable code when the select signal is activated and outputs the initial code when the select signal is deactivated,
- wherein 'n' is an integer that is equal to or greater than 2, and 'm' is an integer that is equal to or greater than 1 and equal to or smaller than 'n'.

20. The semiconductor apparatus according to claim 19, wherein the initial code is a value of a fixed level, and the variable code is inputted from an external device.

21. The semiconductor apparatus according to claim 20, wherein the variable code includes a test mode signal.

22. The semiconductor apparatus according to claim 19, wherein the select signal includes a test mode signal.

23. The semiconductor apparatus according to claim 19, wherein the master chip ID generating unit comprises:
- a master code generating unit configured to select one of the initial code and the variable code according to the select signal and generate a master code; and
- an operation code generating unit configured to subtract '1' from the master code and generate the first operation code.

24. The semiconductor apparatus according to claim 19, wherein the $m^{th}$ slave chip has the $m^{th}$ operation code as the chip ID, and the first to $n^{th}$ slave chips have different chip IDs with each other.

25. The semiconductor apparatus according to claim 19, wherein the $m^{th}$ slave chip has the $(m+1)^{th}$ operation code as the chip ID, and the first to $n^{th}$ slave chips have different chip IDs with each other.

26. The semiconductor apparatus according to claim 19, wherein the master chip ID generating unit and the n slave chip ID generating units are connected in series through a through-silicon via (TSV) structure.

27. The semiconductor apparatus according to claim 19, wherein the first to $(n+1)^{th}$ operation codes cycle sequentially.

* * * * *